(93.)

LYMAN F. MUNGER.

Improvement in Locks.

No. 4,674. Reissued Dec. 12, 1871.

Witnesses:

Parker H. Sweet Jr.
Wm. J. Ludlow

Inventor:

Lyman F. Munger
By James L. Norris,
Associate Attorneys.

UNITED STATES PATENT OFFICE.

LYMAN F. MUNGER, OF ROCHESTER, NEW YORK.

IMPROVEMENT IN LOCKS.

Specification forming part of Letters Patent No. 23,040, dated February 22, 1859; reissue No. 4,674, dated December 12, 1871.

*To all whom it may concern:*

Be it known that I, LYMAN F. MUNGER, of the city of Rochester, in the county of Monroe and State of New York, have invented a certain new and useful Improvement in Locks, of which the following is a specification:

My invention consists in forming the cam which operates the tumblers and lock-bolt with two bits arranged opposite to each other and out of the same plane, which operate in connection with the lock-bolt and tumblers in such a manner that before the bit which throws the lock-bolt leaves the talon-notch of the same the other bit, in turning the cam in either direction, raises one or more of the tumblers out of coincidence with the stump, so that, if pressure is applied to the bolt while the key is in the lock, the said lock-bolt cannot be forced back unless the cam is turned. The construction and arrangement of parts will hereinafter more fully be described in detail.

Figure 1:
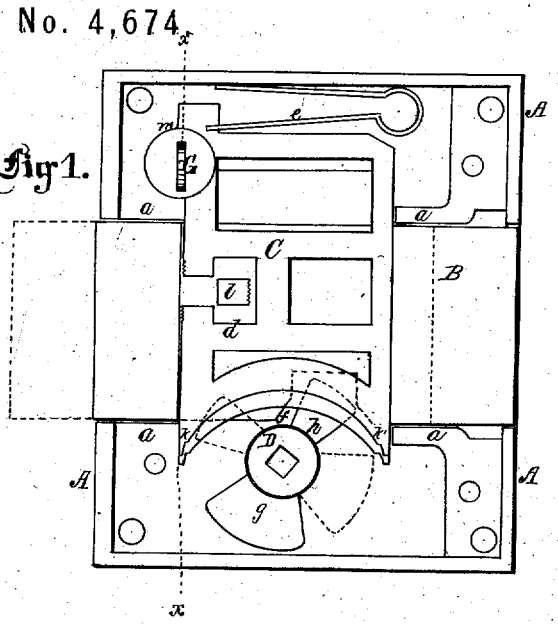
Figure 2:
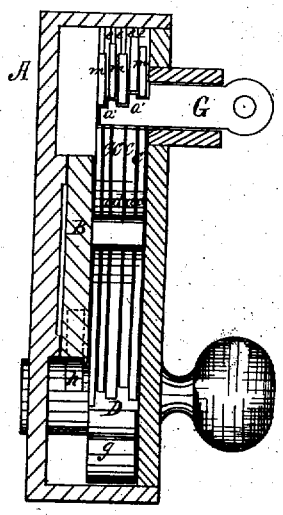
Figure 3:
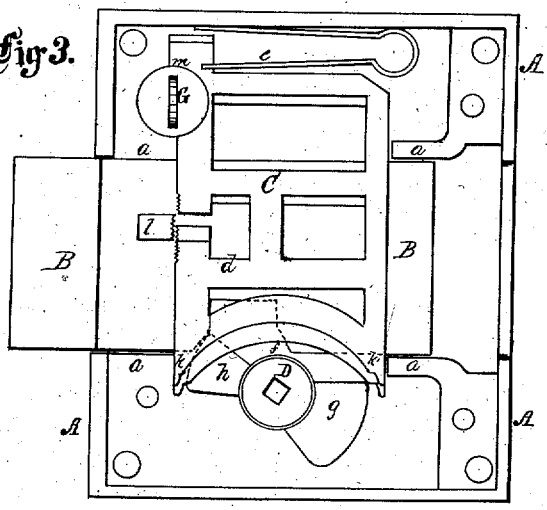

In the drawing, Figure 1 is a face view of my improved lock with the cover-plate removed; Fig. 2, a cross-section in line *x x*. Fig. 3 is a top-plan view, showing the key inserted, the lock-bolt thrown out.

A represents the case of the lock, and B the bolt, which is thrown out and in, in the usual manner. C C C is a series of tumblers, lying one over another, being pressed down by a series of springs, *e e e*, at the top. These tumblers, as in other similar locks, serve to hold the lock-bolt out when locked. The tumblers are provided with notches or recesses *d d d*, and the bolt is provided with a stump or tang, *l*. When the tumblers are set to allow the retraction of the bolt these parts coincide or come in line, and the stump or tang enters the notches, as shown in Fig. 1. At other times, when the bolt is protruded and the tumblers "distributed" or disarranged, the slots *d d d* are out of line, and the stump, striking the edges of the tumblers, prevents the withdrawal of the bolt. In this respect my lock is similar to other locks in use. The outer edges of the tumblers for a suitable distance on each side of the slots *d*, and the inner edge of the stump or tang, are serrated or notched, as shown in Fig. 1. An arbor or cam, D, is employed for operating the bolt and tumblers. This arbor is a hub set at a suitable position within the case, and it has two bits, *g* and *h*, out of line with each other, as shown. The bit *g* acts upon the tumblers to throw them back, and the bit *h* acts upon the bolt. In Fig. 3 of the drawing, *g* is shown as striking against shoulder *k'* formed on the tumbler, while *h* strikes into a notch, *f*, in the bolt. This action is produced by the turning of the arbor in the proper direction.

The gauging or adjusting of the tumblers to bring the notches *d d d* in line for the entrance of the stump or tang is produced by the insertion of a flat key, G, which has a series of notches or bits, *a' a'*, which receive bearings *m m* of the tumblers. These parts so correspond and coincide with each other that the notches *d d* will always come in line when the key is inserted and the tumblers drop on the key; and, since every key is different in every lock, there is no danger of opening the lock by a false key. The employment of this kind of key, and its connection with the tumblers, is also common in other locks, and I lay no claim to it here.

The bits *g h* are arranged opposite to each other on the cam D, and out of the same plane. The bits *g h* are so formed that, before the bit *h* leaves the talon-notch of the lock-bolt, the bit *g*, in turning the cam D in either direction, raises one or more of the tumblers out of coincidence with the stump *l*, so that, if pressure is applied to the end of the bolt while the key is in the lock, it cannot be forced back.

It will also be noticed that all the parts, when the key is in place, are entirely under the control of the cam D, so that the lock-bolt can be moved freely in and out by the turning of the said cam.

By the means above described the tumblers are thrown back so as to be held by the bits or notches upon the key inserted to catch them, and the bolt is also thrown to lock or unlock the door. This action is produced by the single arbor or cam D having the two bits *g h*.

What I claim, and desire to secure by Letters Patent, is—

The cam D, formed with the bits *g h* arranged opposite to each other and out of the same plane, and operating in connection with the tumblers *c* and bolt B, whereby, when the key is inserted and the cam turned in either direction, the bit *g* will raise the tumblers before the bit *h* leaves the notch *f* of the bolt.

Witnesses:
R. F. OSGOOD,
ARCHD. BAINE.

L. F. MUNGER.